(12) United States Patent
Kalyankar et al.

(10) Patent No.: US 8,974,066 B2
(45) Date of Patent: Mar. 10, 2015

(54) OPTICAL COATINGS WITH PLATE-SHAPED PARTICLES AND METHODS FOR FORMING THE SAME

(71) Applicants: Intermolecular Inc., San Jose, CA (US); Guardian Industries Corp. (Auburn Hills, MI, US)

(72) Inventors: Nikhil Kalyankar, Mountain View, CA (US); Richard Blacker, Farmington Hills, MI (US); Scott Jewhurst, Redwood City, CA (US); James Mulligan, Plymouth, MI (US)

(73) Assignees: Intermolecular, Inc., San Jose, CA (US); Guardian Industries Corp., Auburn Hills, MI (US)

( * ) Notice: Subject to any disclaimer, the term of this patent is extended or adjusted under 35 U.S.C. 154(b) by 22 days.

(21) Appl. No.: 13/803,584

(22) Filed: Mar. 14, 2013

(65) Prior Publication Data
US 2014/0268349 A1 Sep. 18, 2014

(51) Int. Cl.
*G02B 27/00* (2006.01)
*G02B 1/11* (2006.01)

(52) U.S. Cl.
CPC . *G02B 1/11* (2013.01); *G02B 1/111* (2013.01)
USPC ...... 359/601; 359/229; 359/290; 359/488.01; 359/580; 359/590

(58) Field of Classification Search
USPC ............. 359/601, 229, 290, 488.01, 580, 591
See application file for complete search history.

(56) References Cited

U.S. PATENT DOCUMENTS

2010/0068504 A1    3/2010  Lin
2011/0255169 A1*  10/2011  Kang et al. ................... 359/601

OTHER PUBLICATIONS

Schelle, C., et al.; One Step AntiglareSolGel Coating for Screens by SolGel Techniques; Jan. 1, 1997; Z-Book—Elsevier; Journal of NonCrystalline Solids pp. 163168.
Curre, E., et al.; Hybrid Nanocoatings in the Display Industry; Jan. 1, 2005; E. P. K. Currie is with DSM Research; Journal of Society of Information Display 8 pages.
Chen, D., et al.; Development of AntiReflection AR Coatings on Plastic Panels for Display Applications; Jan. 1, 2000; Kluwer Academic Publishers; Journal of SolGel Science and Technology pp. 7782.
Xu, Q., et al.; A General Approach for Superhydrophobic Coating with Strong Adhesion Strength; Jun. 16, 2010; The Royal Society of Chemistry; Journal of Materials Chemistry 6 pages.

* cited by examiner

*Primary Examiner* — Scott J Sugarman
*Assistant Examiner* — Sharrief Broome

(57) ABSTRACT

Embodiments provided herein describe optical coatings, panels having optical coatings thereon, and methods for forming optical coatings and panels. A transparent substrate is provided. An optical coating is formed on the transparent substrate. The optical coating includes a plurality of plate-shaped silicon dioxide particles.

12 Claims, 8 Drawing Sheets

| Formulation # | Mass % of each constituent | | | | | |
|---|---|---|---|---|---|---|
| | TEOS | IPA-ST-MS particles | HCl(37%) | Sunlovely LFS HN-050 (300nm) | Sunlovely (large 4000 nm) | |
| IM-AG-07 | 2.7 | 2.7 | 3.21 | 1.5 | 0.3 | |
| IM-AG-08 | 2.7 | 2.7 | 3.21 | 1.5 | 0.6 | |
| IM-AG-09 | 2.7 | 2.7 | 3.21 | 1.5 | 0.9 | |
| IM-AG-10 | 2.7 | 2.7 | 3.21 | 0.9 | 0.3 | |
| IM-AG-11 | 2.7 | 2.7 | 3.21 | 0.9 | 0.6 | |
| IM-AG-12 | 2.7 | 2.7 | 3.21 | 0.9 | 0.9 | |

FIG. 5

OPTICAL COATINGS WITH PLATE-SHAPED PARTICLES AND METHODS FOR FORMING THE SAME

The present invention relates to optical coatings. More particularly, this invention relates to optical coatings that improve, for example, the anti-glare performance of transparent substrates and methods for forming such optical coatings.

BACKGROUND OF THE INVENTION

Anti-glare coatings, and anti-glare panels in general, are desirable in many applications including, portrait glass, privacy glass, and display screen manufacturing. Such optical coatings scatter specular reflections into a wide viewing cone to diffuse glare and reflection. It is difficult to achieve a substrate that simultaneously reduces gloss (i.e., specular reflection) and haze (i.e., diffuse transmittance) while relying on light scattering to obtain anti-glare properties.

Conventional methods of forming anti-glare panels include, for example, wet etching the surface of the substrate, using mechanical rollers with pre-defined textures on substrates to create a surface roughness, and applying thin, polymeric films with texture to the substrates using adhesives. Such methods are expensive, have low throughput (i.e., a low rate of manufacture), and lack of precise control with respect to surface texture, which results in a diffuse scattering coating with poor light transmittance or good light transmittance, but poor reduction of glare. Additionally, coatings formed using the polymeric films often demonstrate poor abrasion resistance and cohesive strength, resulting in the coatings (and/or the substrate itself) being damaged when various forces are experienced.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which:

FIG. 5 is a table describing various sol gel formulations for forming optical coatings in accordance with various embodiments of the present invention.

DETAILED DESCRIPTION

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments described herein provide for optical coatings, and methods for forming optical coatings, that improve the anti-glare (and/or the anti-reflective) performance of transparent substrates. In accordance with some embodiments, this is accomplished by creating optical coatings that include plate-shaped nano/micro-particles made of silicon dioxide (i.e., primary particles). These primary particles are arranged in a series of "stacks" (i.e., secondary particles), which in turn combine into larger "flower" or "star" shaped structures (i.e., tertiary particles). The primary particles may have thicknesses of approximately 100 nanometer (nm) or less.

In some embodiments, the secondary particles have widths of approximately 300 nm, and the tertiary particles have widths (or diameters) of approximately 4000 nm in diameter (or width). The optical coatings may also include a binder material, such as tetraethoxysilane (TEOS), and additional nanoparticles, such a silica particles with widths ranging from 10 to 40 nm. In some embodiments, the optical coatings were formed using a sol-gel system, in which the sol-gel formulations additionally included an organic solvent, such as n-propanol, and an acid catalyst, such as hydrochloric acid.

The use of the primary particles results in desirable antiglare (and/or anti-reflective) characteristics, as well as improved adhesive and cohesive properties.

Figure 1:
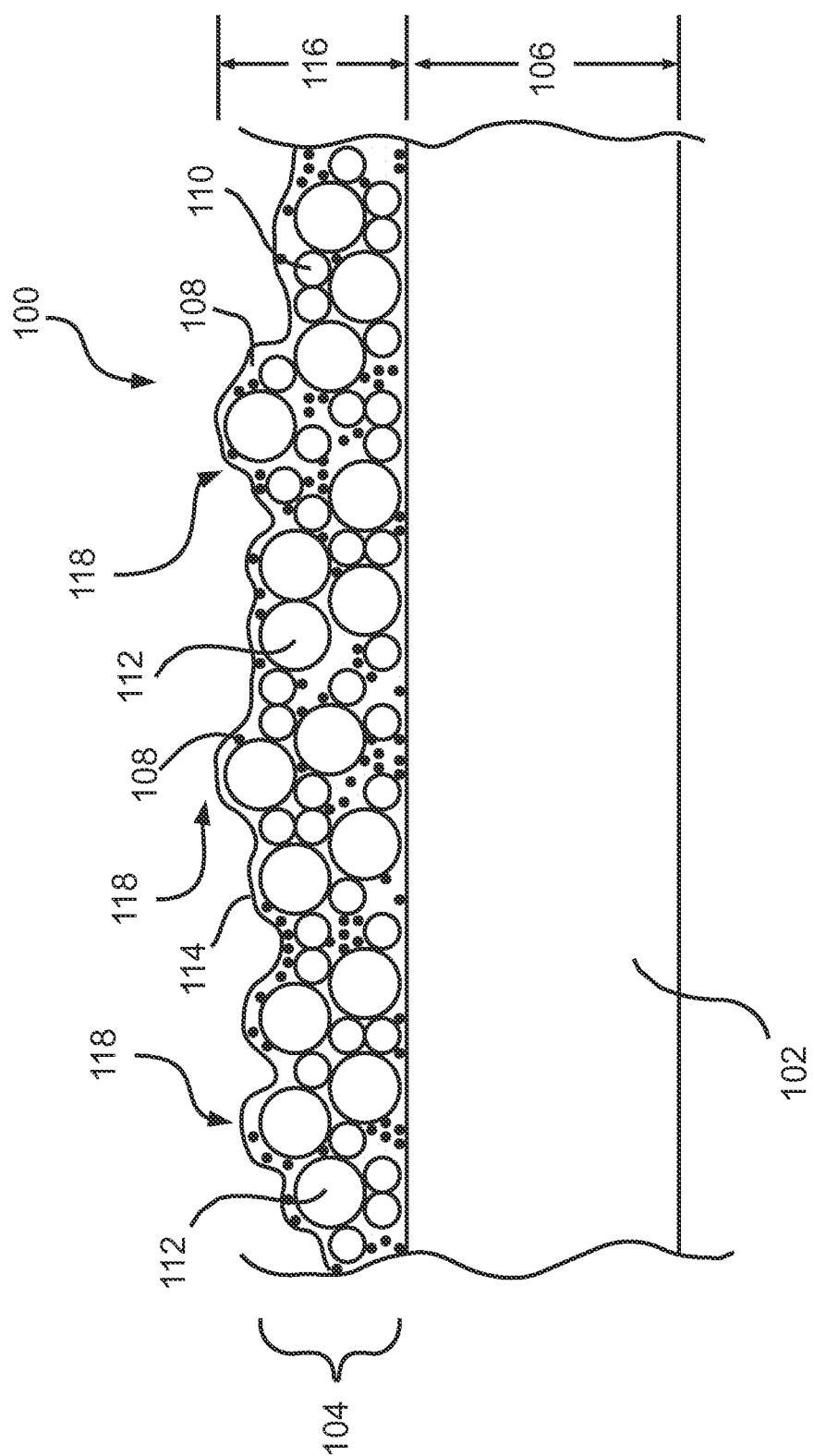
FIG. 1 is a cross-sectional view of a substrate with an optical coating formed thereon, according to some embodiments of the present invention.

FIG. 1 illustrates a portion of an anti-glare (and/or antireflective) panel 100, according to some embodiments of the present invention. The panel 100 includes a transparent substrate 102 and an optical (e.g., anti-reflective) coating 104 formed on an upper surface of the substrate 102. In some embodiments, the transparent substrate 102 is made of glass and has a thickness 106 of, for example, between 0.1 and 2.0 centimeters (cm). Although only a portion of the panel 100 (is shown, it should be understood that the panel 100 (and/or the transparent substrate 102) may have a width of, for example, between 5.0 cm and 2.0 meters (m).

The optical coating 104 includes primary particles 108 (shown in FIG. 1 by "dots"), secondary particles 110 (shown by small circles), tertiary particles 112 (shown by large circles), and a binder material 114. Although not shown, the optical coating 104 may also include an additional set of nanoparticles, as described below. The optical coating has a thickness 116 which ranges between, for example, 0.3 and 100 micrometers (μm). That is, as shown, an upper surface of the optical coating 104 has a series a surface features 118 (i.e., texturing or roughness), the size and shapes of which may be dominated by the size(s) and shape(s) of the tertiary particles 112, which causes the thickness 116 to vary. Due to the features, the upper surface of the optical coating may have an average surface roughness ranging from 0.2 to 0.8 μm.

Although the primary particles 108, the secondary particles 110, and the tertiary particles 112 are shown in FIG. 1 as dots/circles, it should be understood that these shapes have been used merely for ease of illustration and clarity, as these particles 108, 110, and 112 may take the form of "plate-shaped" particles, and structures formed with plate-shaped particles, as described in greater detail below. Additionally, it should be understood that the relative sizes and arrangement of the particles 108, 110, and 112 shown in FIG. 1 is also simply used for illustrative purposes and is not drawn to scale. Further, it should be understood that in some embodiments, the optical coating may not include all three types of particles (e.g., only primary particles 108 and secondary particles 110 or only primary particles 108 and tertiary particles 112).

Figure 2:
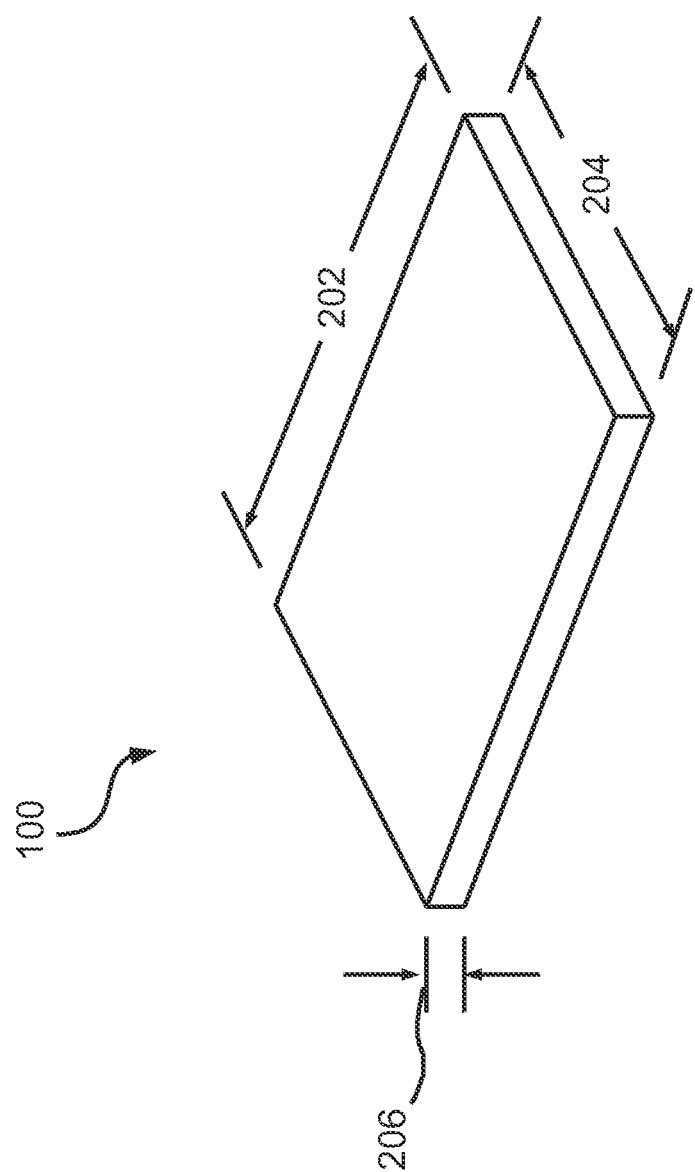
FIG. 2 is an isometric view of a primary particle within the optical coating of FIG. 1, according to some embodiments of the present invention.

FIG. 2 illustrates a primary particle 200 (i.e., one of the primary particles 108 in FIG. 1), according to some embodiments of the present invention. The primary particle 200 is substantially plate-shaped and has, for example, a length 202 of between 300 and 500 nanometers (nm), a width 204 of between 150 and 250 nm, and a thickness of not more than 100 nm (e.g., between 50 and 100 nm). It should be understood that the primary particles 200 (and 108) may vary in size. In some embodiments, the primary particle 200 is made of silicon dioxide. In particular, the primary particle 200 may be made of substantially pure silicon dioxide (i.e., no other materials may be present). As described above, individual primary particles 200 may be present in the optical coating 104, however, a majority of the primary particles 200 (and 108) may be combined into other, larger structures, such as the secondary particles 110 and the tertiary particles 112, as described below.

Figure 3:
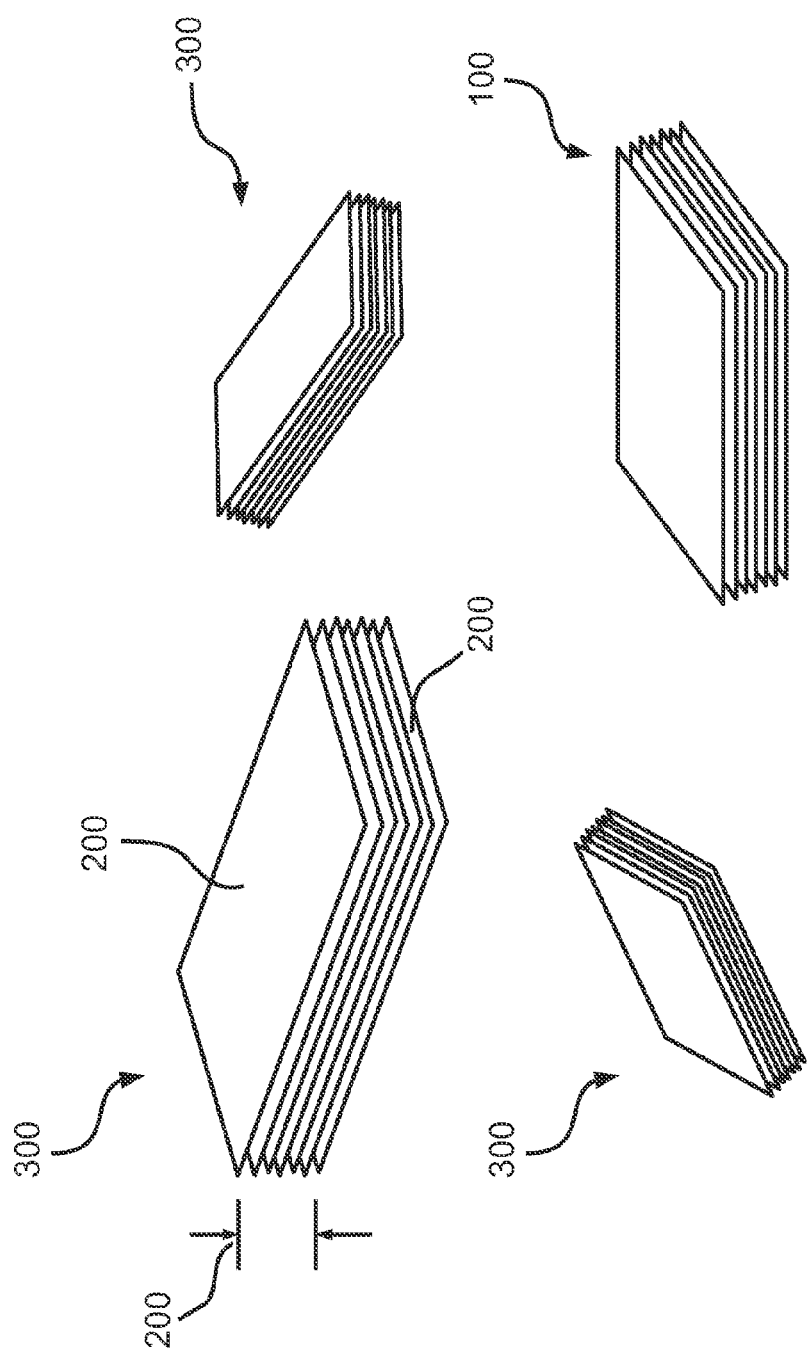
FIG. 3 is an isometric view of secondary particles within the optical coating of FIG. 1, according to some embodiments of the present invention.

FIG. 3 illustrates several secondary particles 300 (i.e., the secondary particles 110 in FIG. 1), according to some embodiments of the present invention. As shown, the secondary particles 300 are made of stacks of the primary particles 200 and thus have substantially rectangular shapes with lengths and widths similar to that of the primary particles 200, but a thickness 302 that is multiples of the thickness 206 of the primary particles 200 (e.g., between 150 and 300 nm). As will be described below, the secondary particles 300, and perhaps some individual primary particles 200, may be initially provided in an aqueous solution/slurry. As shown, the sizes of the secondary particles 300 may vary, due in part to the varying sizes of the primary particles 200.

Figure 4:
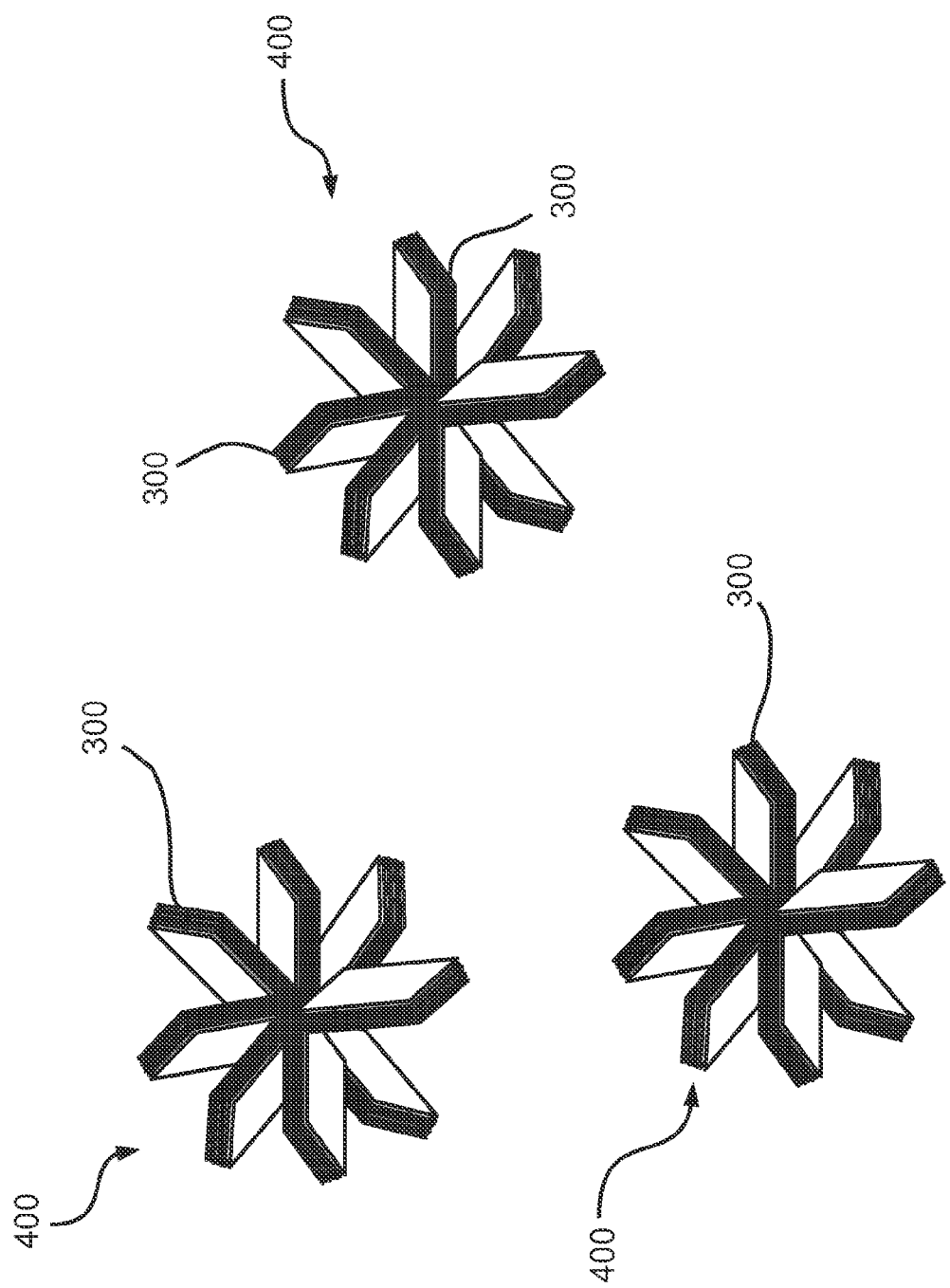
FIG. 4 is an isometric view of tertiary particles within the optical coating of FIG. 1, according to some embodiments of the present invention.

FIG. 4 illustrates several tertiary particles 400 (i.e., the tertiary particles 112 in FIG. 1), according to some embodiments of the present invention. As shown, the tertiary particles 400 are made of/include secondary particles 300 that are combined/joined into "flower-shaped" or "star-shaped," radial structures. The tertiary particles 400 have widths (or diameters) 402 of, for example, between 3000 and 5000 nm, such as approximately 4000 nm. As will be described below, the tertiary particles 400, perhaps along with some primary particles 200 and secondary particles 300, may be initially provided in a dry, powdered form.

In some embodiments, the optical coating (FIG. 1) is formed on/deposited onto the transparent substrate 102 using a sol-gel system, as is commonly understood. In exemplary experimental samples, the sol-gel formulations were created using an organic solvent, such as alcohol (e.g., n-propanol) and a tetraethoxysilane (TEOS) binder.

Additional solvents could be ethanol, n-butanol, n-pentanol, isopropanol etc. Other examples of suitable solvents include ethanol, n-butanol, n-pentanol, isopropanol, etc. Other examples of suitable binder materials include other silicon alkoxides, such as methyltriethoxysilane (MTES), tetramethoxysilane (TMOS), tetrapropoxysilane (TPOS), etc., as well as polysiloxane, tetraalkoxysilane, alkyltrialkoxysilane, oligomeric silicon alkoxide, and soluble silicates, or any combination thereof. Additionally, titanium ethoxide and aluminum ethoxide may be used, as well as polymeric binder materials.

A sol formulation with silica nanoparticles (e.g., 10 to 40 nm) was also added (e.g., to strengthen the binder matrix). An example of such a sol formulation is IPA-ST-MS available from Nissan Chemicals, Houston, Tex. Other examples of nanoparticles include titania, zirconia, alumina, tin oxide, and zinc oxide. An acid catalyst, such as hydrochloric acid was also added, as were the primary, secondary, and tertiary particles described above. Other examples of suitable acid catalysts include acetic acid, sulfuric acid, nitric acid, phosphoric acid, etc.

In some embodiments, the secondary particles 300 were added via an aqueous solution/slurry, such as SUNLOVELY LFS HN-050, and the tertiary particles 400 were added in a dry powder form, such as SUNLOVELY (or SUNLOVELY C), both of which are available from AGC Chemicals Americas, Inc., Exton, Pa. It should be understood that although the primary particles 200 may not be explicitly added to the formulation, individual primary particles 200 may be present in the formulation from either such loose particles in the aqueous solution/slurry and/or the powder.

FIG. 5 is a table describing six exemplary, experimental sol-gel formulations in greater detail. As shown, each of the formulations contained 2.7% TEOS binder by mass, 2.7% silica nanoparticles by mass, and 3.21% hydrochloric acid (37%) by mass. The first three formulations included 1.5% secondary particles (i.e., 300 nm) by mass, while the second three included 0.9% secondary particles by mass. As shown, the formulations alternated between 0.3%, 0.6%, and 0.9% tertiary particles (i.e., 4000 nm) by mass.

All formulations were stirred while mixing and maintained at 60° C. for 2 hours. The formulations were then cooled to room temperature and stirred for at least 20 hours before use. All of the formulations formed stable sols with a cloudy appearance. It should be noted that these formulations did not form precipitates or phase separate after several weeks of storage.

For deposition, the formulations were spin-coated on glass substrates, such as the substrate 102 in FIG. 1, at 500 revolutions per minute (rpm) for 30 seconds. The glass substrates were then heat treated (thus removing the solvent) in an oven at 180° C. to 300° C. for between 5 minutes and 60 minutes.

The optical coatings formed as described above demonstrated improved strength and durability. For example, none of the coatings, when formed on glass, could be wiped off using a solvent soaked lint-free cloth. In contrast, coatings utilizing just spherical silica particles, but otherwise prepared similarly could be easily wiped off in such a manner. Thus, it seems that the use of the silicon dioxide particles described above may impart additional cohesive and adhesive strength to optical coatings. The high surface area of the secondary and tertiary particles due to their specialized geometry may lead to high silanol surface density and aid in imparting such good adhesive and cohesive strength.

Figure 6:
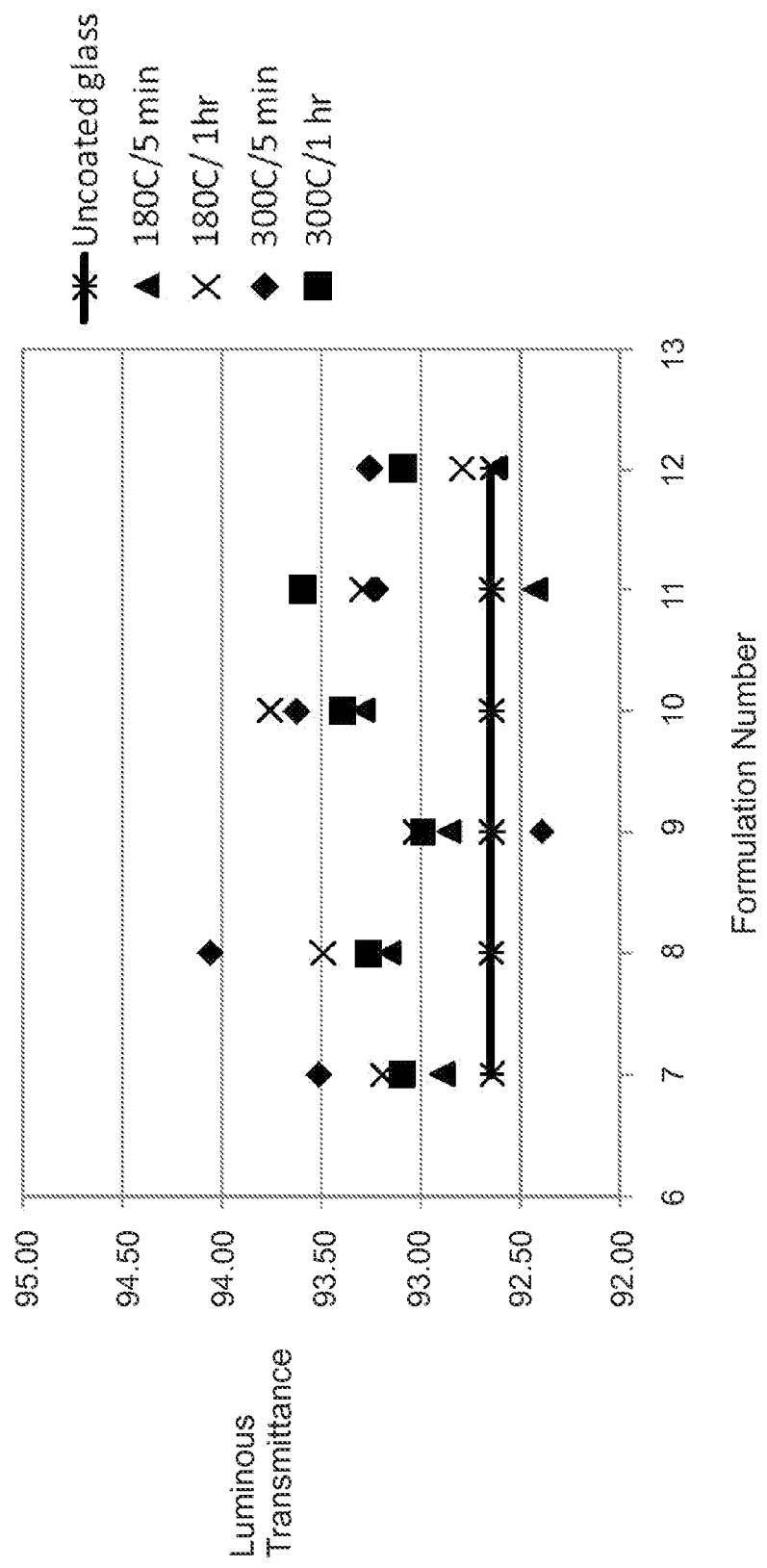
FIG. 6 is a graphical illustration of the luminous transmittance of transparent substrates with the optical coatings of FIG. 5 formed thereon.

Additionally, panels utilizing the optical coatings described above demonstrated desirable luminous transmittance. FIG. 6 graphically illustrates the luminous transmittance, as measured using a HAZE-GARD PLUS transparency meter available from BYK-Gardner USA, Columbia, Md., of anti-glare (and/or anti-reflective) panels formed with the optical coatings as described above.

As shown, 22 of the 24 samples demonstrated improved luminous transmittance compared to uncoated glass. Sample IM-AG-08 (FIG. 5), when heated treated at 300° C. for 5 minutes, demonstrated the highest luminous transmittance of above 94.00%. As will be appreciated one skilled in the art, it is desirable for anti-glare panels (or glass) to have a luminous transmittance value that is at least equal to, if not greater than, uncoated glass.

Figure 7:
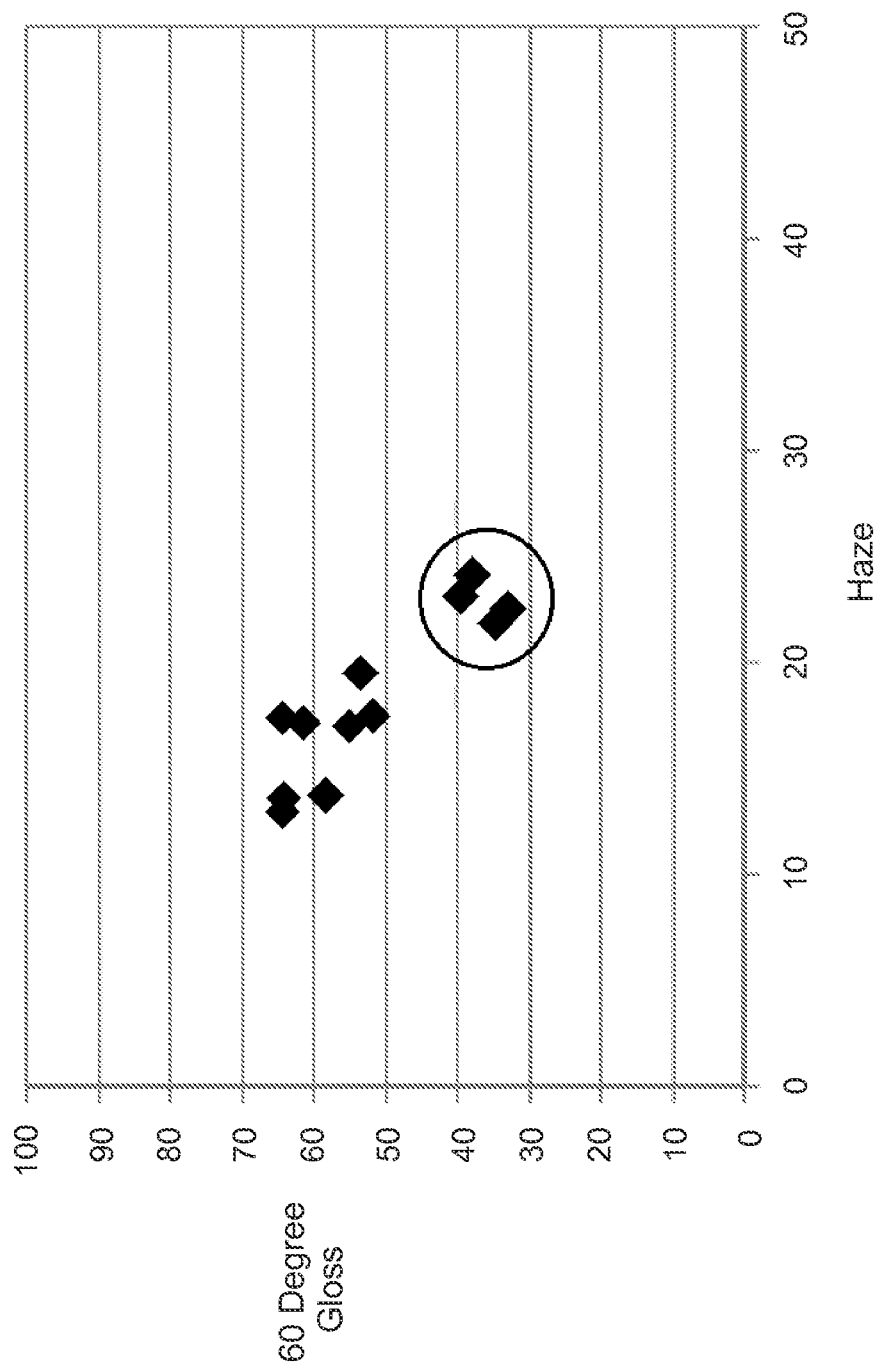
FIGS. 7 and 8 are graphical illustrations comparing gloss and haze of transparent substrates with the optical coatings of FIG. 5 formed thereon.
Figure 8:
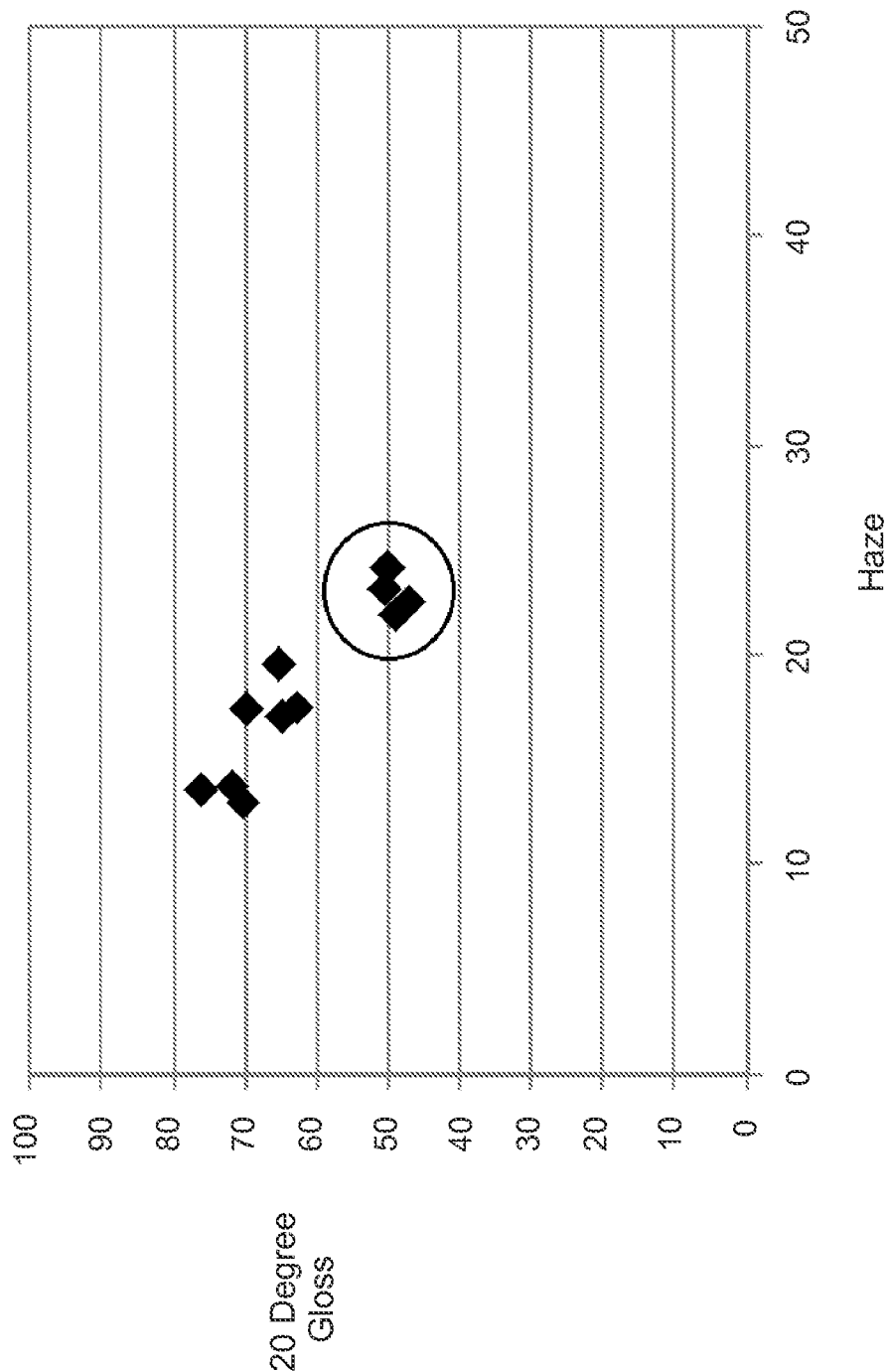

FIGS. 7 and 8 graphically illustrate 60 degree (i.e., angular) gloss and 20 degree gloss, respectively, compared to haze as measured using a gloss meter, such as those also available from BYK-Gardner USA, Columbia, Md., for the anti-glare (and/or anti-reflective) panels formed with the optical coatings as described above. The data points that are circled represent panels/coatings that demonstrate gloss vs. haze values comparable to panels using conventional methods (e.g., wet etching the substrate, polymeric films, etc.). Thus, the optical coatings described above (i.e., using the silicon dioxide plate-shaped particles) allows for acceptable anti-glare performance.

Referring again to FIG. 1, the tertiary particles 112 may dominate the morphology generated by the added particles, which will be modified by the aggregated slurry (final structure unknown) and any additional particles. The binder material 114 essentially serves as a glue and to smooth out the surface morphology slightly. As is evident in FIG. 1, a "pore" structure is formed in the coating 104 from gaps between the particles 110 and 112 and between the "petals" of the tertiary particles 112.

The coating may also generate an anti-reflection property. For example, as indicated in FIG. 6, the glass substrates coated with the optical coatings described herein demonstrate improved transmittance (i.e., and thus reduced reflection) compared to bare glass. The anti-reflection property may result from either a "moths-eye" effect with the surface morphology caused by the tertiary particles 112 and the binder material 114, or by the formation of a reduced refractive index layer or graded refractive index within the coating 104 due to the presence of porosity.

Further, the use of the optical coatings described herein allows for a controllable surface roughness (i.e., the features 118 in FIG. 1) that corresponds to the visible range of electromagnetic radiation (i.e., visible light, wavelength of between 0.4 and 0.8 μm), which can be consistently reproduced. The surface roughness described above with respect to FIG. 1 may be ideal for light scattering needed to impart antiglare properties.

Thus, in some embodiments, a method for forming an optical coating is provided. A transparent substrate is provided. An optical coating is formed on the transparent substrate. The optical coating includes a plurality of plate-shaped silicon dioxide particles.

In other embodiments, a method for forming a method for forming an anti-glare panel is provided. A transparent substrate is provided. A sol-gel formulation is provided. The sol-gel formulation includes a plurality of plate-shaped silicon dioxide particles and a solvent. The sol-gel formulation is deposited onto the transparent substrate.

In a other embodiments, an anti-glare panel is provided. The anti-glare panel includes a transparent substrate and an anti-glare coating formed on the transparent substrate. The anti-glare coating includes a plurality of plate-shaped silicon dioxide particle Although the foregoing examples have been described in some detail for purposes of clarity of understanding, the invention is not limited to the details provided. There are many alternative ways of implementing the invention. The disclosed examples are illustrative and not restrictive.

What is claimed:

1. A method for forming an optical coating, the method comprising:
   providing a transparent substrate; and
   forming an optical coating on the transparent substrate, wherein the optical coating comprises a plurality of plate-shaped silicon dioxide particles, and at least some of the plate-shaped silicon dioxide particles are arranged in a plurality of tertiary particles, and wherein the optical coating is formed on the transparent substrate using a sol-gel system, and the transparent substrate comprises glass.

2. The method of claim 1, wherein the plate-shaped silicon dioxide particles have a thickness that is not more than 100 nanometers (nm).

3. The method of claim 2, wherein at least some of the plate-shaped silicon dioxide particles are arranged in a plurality of stacks.

4. The method of claim 3, wherein at least some of the plurality of stacks form the plurality of tertiary particles.

5. The method of claim 1, wherein the optical coating further comprises a binder material.

6. The method of claim 5, wherein the binder material comprises tetraethoxysilane (TEOS), methyltriethoxysilane (MTES), tetramethoxysilane (TMOS), tetrapropoxysilane (TPOS), or a combination thereof.

7. The method of claim 1, wherein the optical coating further comprises a plurality of nanoparticles.

8. The method of claim 7, wherein the nanoparticles comprise silica.

9. The method of claim 4, wherein the plurality of stacks have a first width, and the tertiary particles have a second width.

10. A method for forming an anti-glare panel, the method comprising:
    providing a transparent substrate;
    providing a sol-gel formulation, wherein the sol-gel formulation comprises a plurality of plate-shaped silicon dioxide particles and a solvent, and at least some of the plate-shaped silicon dioxide particles are arranged in a plurality of tertiary particles;
    wherein the sol-gel formulation further comprises a binder material, wherein the sol-gel formulation further comprises a plurality of nanoparticles, and wherein the binder material comprises tetraethoxysilane (TEOS) and the nanoparticles comprise silica; and
    depositing the sol-gel formulation onto the transparent substrate.

11. The method of claim 10, wherein at least some of the plate-shaped silicon dioxide particles are arranged in a plurality of stacks, and at least some of the plurality of stacks form the plurality of tertiary particles.

12. A anti-glare panel comprising:
    a transparent substrate; and
    an anti-glare coating formed on the transparent substrate, wherein the anti-glare coating comprises a plurality of plate-shaped silicon dioxide particles, and at least some of the plate-shaped silicon dioxide particles are arranged in a plurality of tertiary particles,
    wherein at least some of the plate-shaped silicon dioxide particles are arranged in a plurality of stacks, and at least some of the plurality of stacks form the plurality of tertiary particles,
    wherein the plurality of stacks have a first width, and the plurality of tertiary particles have a second width,
    wherein the anti-glare coating further comprises a plurality of silica nanoparticles, and
    wherein the anti-glare coating further comprises a tetraethoxysilane (TEOS) binder material.

* * * * *